US005570332A

United States Patent [19]
Heath et al.

[11] Patent Number: 5,570,332
[45] Date of Patent: Oct. 29, 1996

[54] METHOD FOR REDUCING ROTATIONAL LATENCY IN A DISC DRIVE

[75] Inventors: Mark A. Heath; D. Christopher Pruett; Bang C. Nguyen, all of Oklahoma City, Okla.

[73] Assignee: Seagate Technology, Inc., Scotts Valley, Calif.

[21] Appl. No.: 449,758

[22] Filed: May 25, 1995

[51] Int. Cl.$^6$ .................................................. G11B 7/00
[52] U.S. Cl. ................... 369/50; 369/47; 369/54; 369/32; 369/44.28; 369/78.04
[58] Field of Search .................. 369/32, 47, 48, 369/49, 50, 54, 58, 59, 124, 44.25, 44.28, 44.29, 44.32, 44.34; 360/69, 73.07, 75, 78.04, 78.06, 78.07; 395/441, 425

[56] References Cited

U.S. PATENT DOCUMENTS

| | | | |
|---|---|---|---|
| 4,656,538 | 4/1987 | Mattson | 360/77 |
| 4,899,234 | 2/1990 | Genheimer | 360/78.06 |
| 5,140,683 | 8/1992 | Gallo et al. | 395/425 |
| 5,150,266 | 9/1992 | Albert | 360/78.07 X |
| 5,151,639 | 9/1992 | Hasegawa et al. | 360/78.07 X |
| 5,247,498 | 9/1993 | Takekoshi et al. | 360/78.07 X |
| 5,268,804 | 12/1993 | Wallis | 360/78.04 |
| 5,422,762 | 6/1995 | Jerbic | 360/48 |
| 5,459,853 | 10/1995 | Best et al. | 395/441 |

FOREIGN PATENT DOCUMENTS 0 490 485 A2  6/1992  European Pat. Off. .

OTHER PUBLICATIONS

Japanese Patent Abstract No. JP 2276083, Nov. 9, 1990, p. 1.
Japanese Patent Abstract No. JP 63247987, Oct. 14, 1988, p. 1.
Japanese Patent Abstract No. JP 1121920, May 15, 1989, p. 1.
Japanese Patent Abstract No. JP 4191921, Jul. 10, 1992, p. 1.
Japanese Patent Abstract No. JP 2165220, Jun. 26, 1990, p. 1.
Seltzer, et al., "Disk Scheduling Revisited", Usenix Winter 1990 Technical Proceedings, pp. 313–324, Jan. 22, 1990.
Jacobson, et al., "Disk Scheduling Algorithms Based on Rotational Position", Hewlett–Packard Laboratories Technical Report, HPL–CSP–91–7, Feb. 26, 1991, pp. 1–18.

*Primary Examiner*—Nabil Z. Hindi
*Assistant Examiner*—Muhammad N. Edun
*Attorney, Agent, or Firm*—Kinney & Lange, P.A.

[57] ABSTRACT

The present invention is a method for decreasing rotational latency in systems which include a data retrieval element and a rotating medium. The method requires that the rotating medium be divided into a plurality of discrete angular regions. For each discrete angular region, a number of cylinders that may be traversed by the data retrieval element during a single revolution of the medium is identified. A rotational latency assigned to each discrete angular region based on a current location of the retrieval element. A command queue array is searched for a command that addresses a location within a range of cylinders determined by the number of cylinders in the discrete angular region having the smallest rotational latency. Finally, the command addressing a location in the range of cylinders in the selected discrete angular region of the medium is executed.

36 Claims, 8 Drawing Sheets

METHOD FOR REDUCING ROTATIONAL LATENCY IN A DISC DRIVE

BACKGROUND OF THE INVENTION

The present invention relates to seek operations and rotating disc drive memory assemblies. More particularly, the present invention relates to a method for sorting the command queue to reduce rotational latency in disc drive memory assemblies.

Rotating disc memories include one or more discs driven about a spindle axis. Each disc has a plurality of concentric tracks, on one or both surfaces from which information is read or onto which information is written by a read/write element. In addition, each track is further divided into a plurality of sectors. A track cylinder is formed by the radially corresponding tracks on the disc memories. In a disc drive system, a disc rotates at a high speed while the read/write element "flies" over the surface of the rotating disc. The read/write element is positioned over specific areas or sectors of the disc in accordance with commands received from the host computer.

The SCSI interface protocol provides a mechanism for host computers to send multiple commands to a disc drive. It allows the disc drive to determine the optimum order of execution for the commands. The set of commands available for execution by the disc drive is referred to as the "command queue".

Traditionally, disc drives have sorted the command queue in an order that minimizes seek time between the various commands. The seek time is the time required for the read/write element to radially move across or traverse cylinders between the present cylinder over which the read/write element is positioned and the cylinder to be addressed by the particular command.

However, seek time is only one of two components of the true access time of a command. The other component is the rotational latency time or the amount of time the disc drive spends waiting for the appropriate data to rotate under the read/write element. The rotational latency time is a significant part of the total access time for all but the longest seeks. On average, it is the dominant component of the total access time for relatively short seeks.

To determine the optimum order of execution of a set of commands, it is desirable to consider the full access time between commands rather than simply the seek time. An ideal sorting or disc scheduling algorithm would sort the command queue in such a way that the sum of the access times of all of the commands in the queue is minimized. This would involve computing the sum of the access times for each of the possible orders of the queue. Computing access times for every possible order, however, is far too computationally intensive to do in a real-time system such as a disc drive. For example, there are over three million possible orders in a set of ten commands. Modern disc drives can have up to 64 or more commands in the command queue. In addition, the command queue in practical applications is dynamic. In other words, new commands are constantly received from the host computer. Thus, the optimum order of execution of previously received commands often changes, requiring the entire queue to be re-sorted.

Since the above-mentioned ideal algorithm is impractical, alternative methods of disc scheduling have been devised. One such disc scheduling algorithm is the shortest access time first algorithm discussed in Jacobson et al., "Disc Scheduling Algorithm Based On Rotational Positions", Hewlett-Packard Laboratories Technical Report, HPL-CSP-91-7, Feb. 26, 1991, pp. 5–18. The shortest access time first algorithm scans the command queue of pending commands and calculates an access time for each command given the known position of the read/write element (if the disc is idle), or the expected position of the read/write element at the end of the current command. The access time is calculated by using a static array containing seek times for each possible seek distance. To reduce the number of commands which must be scanned and for which an access time must be calculated, the shortest access time first algorithm divides the disc into a number of bins. The commands in the command queue are grouped based on the location addressed by each particular command. The bins are then searched in an order determined by a current position of read/write element. The order of bins to be searched based upon the current location of the read/write element is precomputed and stored in an array indexed by the position of the read/write element. The list of bin orderings may require about eight kilobytes of memory for a disc divided into 64 bins.

To select a command for execution, the algorithm calculates an access time for each of the commands grouped into the first non-empty bin found. After the access time for each of the commands is calculated, the command having the shortest access time is generally executed. However, some bins contain cylinders on both sides of the rotational latency line or head trajectory. In other words, some bins may contain only command addresses that can only be accessed in two revolutions. To cope with scenarios where the first non-empty bin contains only command addresses outside of the rotational latency line or head trajectory, the algorithm additionally requires that a threshold value be calculated and stored for each bin or cell. The threshold value represents the largest possible access time a command may have to be executed. After an access time is calculated for each and every command location within the particular bin being scanned, the best or smallest access time of all the commands is compared with the threshold value. If the best access time of all the commands is below the threshold value, the command having the lowest access time is executed. However, if the best access time of all the command addresses within the bin is greater than the threshold value, the algorithm repeats by scanning all of the commands and calculating an access time for all of the commands in the next non-empty bin.

Although the shortest access time first scheduling algorithm is an improvement over sorting algorithms which merely minimize seek time between commands, the shortest access time first algorithm has several drawbacks. First, the shortest access time first method is extremely time consuming for commands which address clustered locations on the disc. In the operation of many systems, the command queue may, at any one moment, contain a set of commands which address locations that are clustered in a particular area of the disc. As a result, a single bin may contain an extremely large number of command addresses. Because the shortest access time first algorithm requires that the access time be calculated for each and every command address within the particular bin, the algorithm is extremely time consuming for a bin containing clustered addresses for a large number of commands.

Second, the shortest access time first algorithm requires a significant amount of memory. As discussed above, the shortest access time first algorithm requires an array indexed by a position of the read/write element which lists a bin search order for each possible starting bin. In addition, the algorithm further requires an array containing threshold values for each bin. The eight kilobytes of memory required for the array is significant compared to the amount of memory available on some disc drives.

SUMMARY OF THE INVENTION

The present invention is a method for decreasing rotational latency in systems which include a data retrieval element and a rotating medium. The method requires that the rotating medium be divided into a plurality of discrete angular regions. For each discrete angular region, a number of cylinders that may be traversed by the data retrieval element during a single revolution of the medium is identified. A rotational latency is assigned to each discrete angular region based on a current location of the retrieval element. A command queue array is searched for a command that addresses a location within a range of cylinders in the discrete angular region having the smallest rotational latency. Finally, the command addressing a location in the range of cylinders in the selected discrete angular region of the medium is executed.

DETAILED DESCRIPTION OF THE PREFERRED EMBODIMENTS

Figure 1:
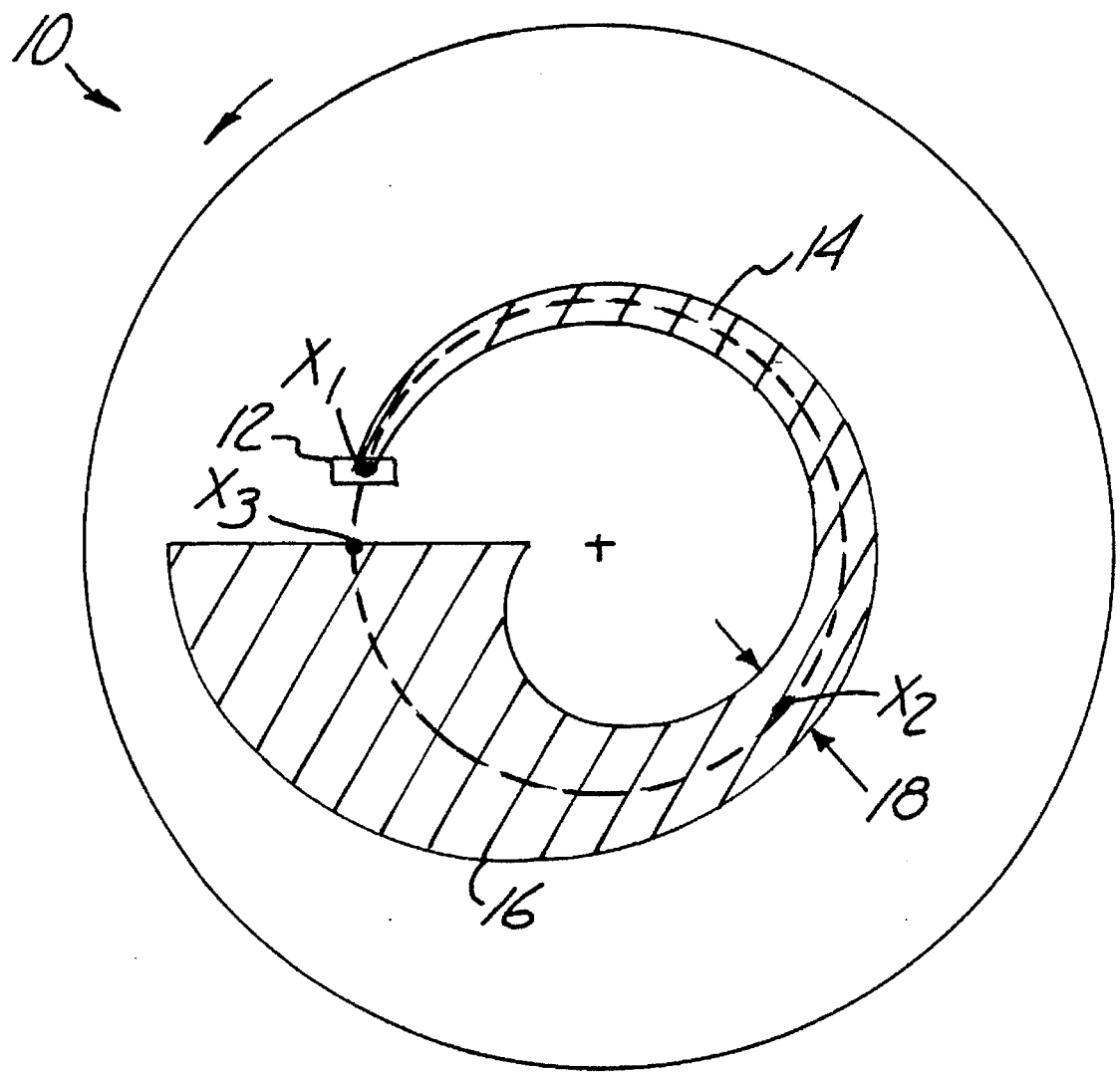
FIG. 1 illustrates a plan view of a rotating disc and a read/write element with portions of the disc that can be reached by the read/write element within one revolution being shaded.

FIG. 1 illustrates a plan view of rotating disc 10 and read/write element 12. As shown by FIG. 1, disc 10 is rotating in a counter-clockwise direction. Read/write element 12 is shown positioned at location $X_1$ and moves clockwise relative to rotating disc 10. Cylinder path 14 (represented by a dashed line) is the current track or cylinder over which read/write element 12 is located. Maximum seek range 16 (represented by the shaded area) is the maximum range of cylinders that can be traversed by read/write element 12 on either side of cylinder path 14 during the time necessary for disc 12 to substantially complete one revolution from its current position at point $X_1$. Seek range 16 has a radial length 18 which defines the maximum number of cylinders that may be accessed on either side of cylinder path 14 at a selected angular distance from the present location of read/write element 12. Accordingly, seek range 16 represents the maximum area of disc 10 which may be accessed by read/write element 12 during a substantially complete revolution of disc 10. For example, assume that read/write element 12 is able to cross a total to 200 cylinders during time necessary for disc 10 to complete one revolution. In particular, during the time necessary for disc 10 to complete one revolution, beginning from point $X_1$, read/write element 12 will be able to traverse 200 cylinders. At point $X_1$, shaded region 14 is extremely small because disc 10 requires an extremely small amount of time to rotate point $X_1$ below read/write element 12. During this extremely small amount of time, read/write element 12 is able to traverse, in either direction, only an extremely small number of cylinders. At point $X_2$, however, the time necessary for disc 10 to complete approximately half of a revolution has passed. The number of cylinders that read/write element 12 can traverse during this time is approximately 100 cylinders. Correspondingly, the radial length 18 of maximum seek range 16 at point $X_2$ has significantly increased with respect to the radial length 18 of maximum seek range 16 at point $X_1$. At point $X_3$, the time necessary for disc 10 to complete almost an entire revolution has passed. During this larger amount of time, read/write element 12 is able to traverse an even larger number of cylinders on either side of cylinder path 14. Accordingly, the radial length 18 of maximum seek range 16 immediately adjacent point $X_3$ represents the largest number of cylinders that may be crossed in one revolution (approximately 200 cylinders).

Figure 2:
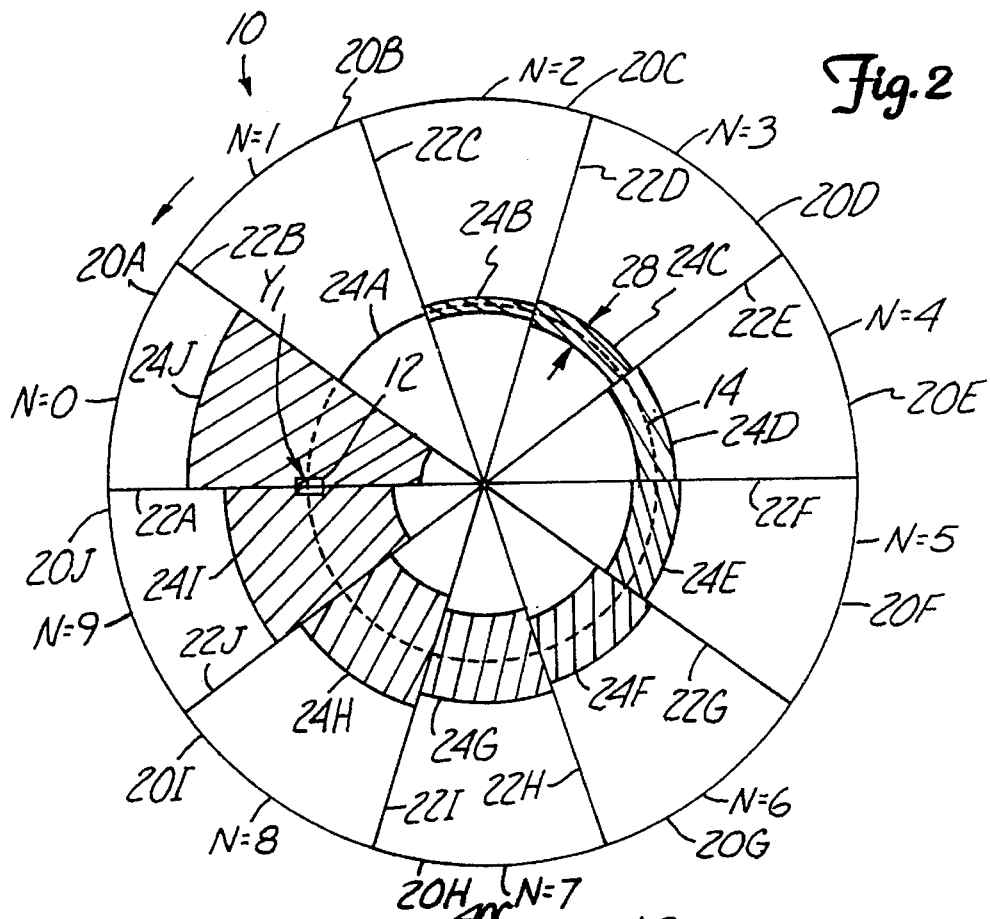
FIG. 2 illustrates the rotating disc of FIG. 1 divided into discrete angular regions having assigned seek ranges and having boundaries which vary based on the current position of the read/write element.
Figure 3:
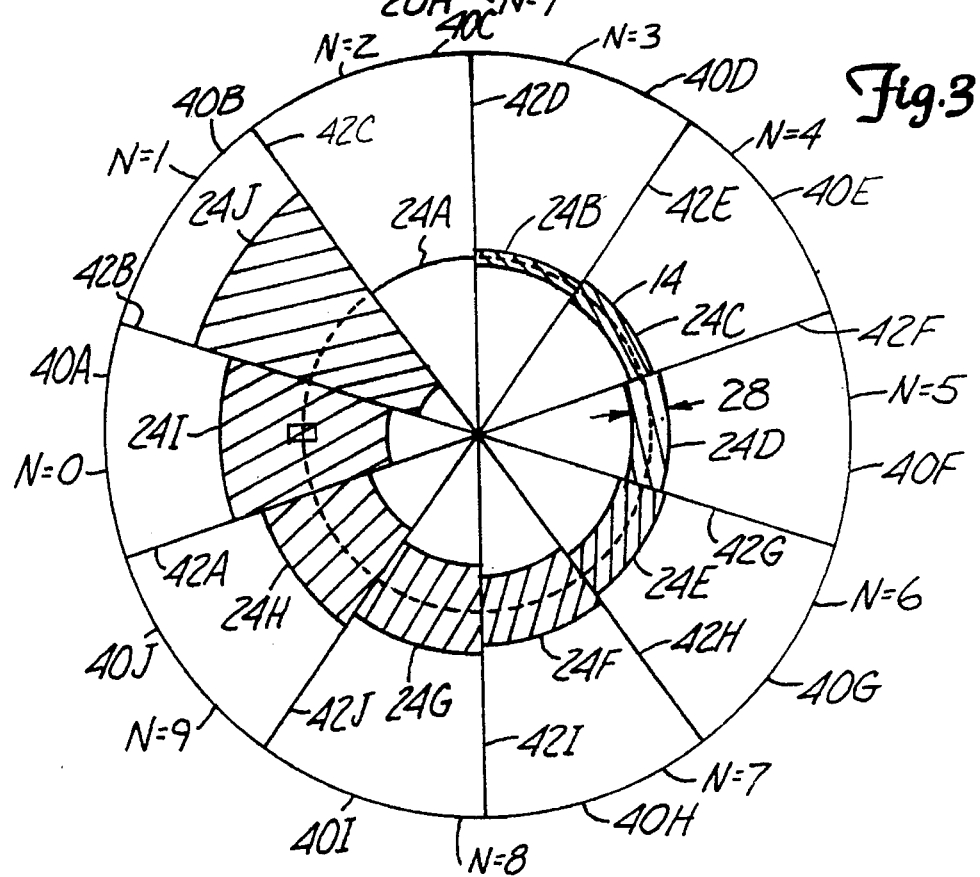
FIG. 3 illustrates the rotating disc of FIG. 1 divided into discrete angular regions having fixed boundaries independent of the current position of the read/write element and assigned seek ranges based on the current position of the read/write element.

The present invention is a method for sorting or scheduling commands in a command queue array to substantially minimize the time necessary to access commands. The method substantially minimizes command access time for a system by identifying a command from the command queue array which addresses a location within a region having the smallest rotational latency from the current position of the read/write element 12 and within seek range 16. If the method fails to find a command in the command queue which addresses a location within seek range 16, seek range 16 is iteratively expanded by the number of cylinders which can be additionally traversed by read/write element 12 during an additional revolution of disc 10. Seek range 16 is iteratively expanded until a command addressing a location within the current seek range is identified and executed. FIGS. 2 and 3 illustrate the method of the present invention.

FIGS. 2 and 3 illustrate alternate methods of modeling or dividing rotating disc 10 into discrete angular regions. FIG. 2 illustrates a method of dividing rotating disc 10 into angular regions having boundaries which vary and are radially spaced from one another based upon the present or expected location of the read/write element 12. FIG. 3 illustrates disc 10 divided into discrete angular regions having fixed boundaries. For illustration purposes, FIGS. 2 and 3 show disc 10 as being divided into ten angular regions. As can be appreciated, disc 10 may be divided into any desired number of angular regions. For example, disc 10 may alternatively be divided into 250 angular regions to provide increased resolution of rotational positions.

FIG. 2 shows disc 10 divided into discrete angular regions 20A–20J separated by variable boundary lines 22A–22J. Angular regions 20A–20J are defined based upon the present location of read/write element 12. In particular, boundary line 22A which divides angular regions 20A and 20J is always defined as extending just counter-clockwise to the present angular position of read/write element 12. Boundary line 22A and the remaining boundary lines 22B–22J, vary in location based upon the varying locations of read/write element 12. Accordingly, angular region 20A is defined as lying beneath the present location of read/write element 12. The remaining angular regions 20B–20J are spaced therefrom. Angular regions 20A–20J and their respective boundaries 22A–22J rotate in conjunction with angular repositioning of read/write element 12.

FIG. 3 illustrates disc 10 divided into discrete angular regions 40A–40J separated by fixed boundary lines 42A–42J. In contrast to the method illustrated in FIG. 2 which defines the boundaries 22 of discrete angular regions 20A–20J based upon the present location of read/write element 12, the present method illustrated in FIG. 3 permanently defines boundaries 42 of discrete angular regions 40A–40J upon the surface of disc 10. For purposes of sorting the command queue, the command addresses are converted into a cylinder, head and angular region address. The angular regions provide a common system of measurement for all addresses regardless of recording zone.

As further shown in FIGS. 2 and 3, a relative angular region number, N=0 to 9, is assigned to discrete angular regions 20A–20J, 40A–40J based on the relative location of the region to read/write element 12. In particular, the particular region containing read/write element 12 is assigned a relative angular region number N=0. Each clockwise successive angular region is successively numbered from N=1 to N=9. The relative angular region numbers N are always treated modulo X, where X equals the number of angular regions. In the present example, the region numbers are treated modulo 10. For example, the difference in rotational position from angular region N=9 to angular region N=2 is 3.

Once disc 10 is divided into discrete angular regions as shown in FIGS. 2 and 3, a rotational latency is assigned to each discrete angular region based upon the particular method used to divide disc 10 into regions and each particular region's relative angular region number. For illustration purposes, this rotational latency time is described as a fraction of the time necessary for the disc to complete one revolution. When disc 10 is divided into discrete angular regions having variable boundary lines as illustrated in FIG. 2, read/write element 12 must cross at least approximately one angular region ($\frac{1}{10}$th of a revolution) before reaching boundary line 22B and the discrete angular region having relative angular region number N=1 (region 20B). Similarly, read/write element 12 must cross at least approximately two angular regions ($\frac{2}{10}$ths of a revolution) before reaching boundary line 22C and the discrete angular region having a relative angular region number N=2. Thus, each discrete angular region 20A–20J is assigned a rotational latency value of N/10ths of a revolution, where N=the region's angular region number N. For the discrete angular region having a relative angular region number N=0, disc 10 must rotate one complete revolution before read/write element 12 crosses boundary line 22J. Therefore, the discrete angular region having relative angular region number zero has a rotational latency of one complete revolution of disc 10.

When disc 10 is divided into discrete angular regions having fixed boundary lines as illustrated in FIG. 3, read/write element 12 may be presently located anywhere between the counter-clockwise and clockwise boundaries of the particular discrete angular region. As the position of read/write element 12 approaches the clockwise boundary of a particular discrete angular region, the rotational latency of the next adjacent clockwise region (angular region number N=1) approaches zero. To account for this varying rotational latency, each discrete angular region is assigned a minimum rotational latency required for a particular discrete angular region to rotate beneath read/write element 12. Thus, each discrete angular region number is assigned a minimum rotational latency of (N−1)/10ths of a revolution, where N is the discrete angular region's relative angular region number.

The discrete angular region having a relative angular region number of N=0 requires disc 10 to rotate a minimum of $\frac{9}{10}$ths of a revolution and is assigned a rotational latency of $\frac{9}{10}$ths of a revolution. To insure a minimum of at least $\frac{1}{10}$th of a revolution for read/write element 12 to access a command, the method requires disc 10 to rotate through a complete revolution before accessing a command within the discrete angular region having a relative angular region number of N=1. Thus, the discrete angular region having a relative angular region number of N=1 is assigned a rotational latency of the time necessary for disc 10 to complete a full revolution.

Based upon the rotational latency assigned to each discrete angular region, a limiting criterion is assigned to each discrete angular region to identify a command within the command queue array which addresses a command address within seek range 16 shown in FIG. 1. The limiting criterion is used to select the next command to be executed and may be defined by any one of several parameters. For example, the limiting criterion may be defined by a number of cylinders that read/write element 12 may traverse during the assigned rotational latency of the particular discrete angular region. Once this cylinder range or seek range is calculated for each discrete angular region using the assigned rotational latency of each discrete angular region, the method merely needs to search the command queue array for a command having a command address within the cylinder range in the discrete angular region having the smallest rotational latency.

FIGS. 2 and 3 illustrate the use of a seek range or cylinder range as a limiting criterion for selecting a command to be executed from the command queue array. As shown by FIGS. 2 and 3, each discrete angular region is assigned a cylinder range 24A–24J (represented by shaded regions) based upon the region's particular rotational latency. Cylinder ranges 24A–24J are radially centered about the present or expected cylinder path 14 of read/write element 12. As illustrated by FIGS. 2 and 3, cylinder ranges 24A–24J collectively form a template which is rotated in conjunction with the assignment of relative angular region numbers N and which is radially moved inward and outward based upon the present angular and radial location of read/write element 12.

Each cylinder range 24A–24J has a radial length 28 which represents a minimum number of cylinders that may be traversed by read/write element 12 during a single revolution of disc 10. More particularly, the radial length 28 of each cylinder range 24A–24J represents a number of cylinders within the corresponding discrete angular region 20A–20J, 40A–40J that may be traversed by read/write element 12 on either side of the initial cylinder path 14 during the minimum time necessary for the counter-clockwise boundary line of the particular discrete angular region 20A–20J, 40A–40J to rotate below read/write element 12. Because the impact of lost revolutions caused by cylinder ranges which are too wide is worse than the impact of lost queue sorting opportunities caused by too narrow cylinder ranges, the radial length 28 of each cylinder range 24A–24J is constant and is shorter than the corresponding radial length 18 of seek range 16 shown in FIG. 1. The radial length 28 of each cylinder range 24 is preferably provided by a seek range array or look-up table having a maximum number of cylinders that may be traversed by read/write element 12 during the time necessary for a particular relative angular region to rotate beneath read/write element 12 (i.e. the region's rotational latency).

To minimize access time for commands in the command queue array, the method searches the command queue array for a command having a command address within the cylinder range 24 associated with the discrete angular region having the smallest rotational latency. To locate a command address within the associated cylinder range of the discrete angular region having the smallest rotational latency, the discrete angular regions 20A–20J are preferably searched in ascending order beginning with the region having the smallest rotational latency. If a command is not identified for the present discrete angular region being searched, the method continues by searching the next successive discrete angular region. The search continues, region by region, until the region having the largest seek range is searched. If no command is identified having an associated command address within one of cylinder ranges 24A–24J, the radial length 28 of cylinder ranges 24A–24J is incremented by the number of cylinders that read/write element 12 may additionally traverse during an additional revolution of disc 10. After each cylinder range 24A–24J is incremented, the method once again searches the command queue array for a command having a command address within the cylinder range of the discrete angular region having the smallest rotational latency. Each seek range is incremented by the number of cylinders that read/write element 12 may traverse during an additional revolution of disc 10 until a command having a command address within the cylinder range of the discrete angular region having the smallest rotational latency is found and executed.

Figure 4A:
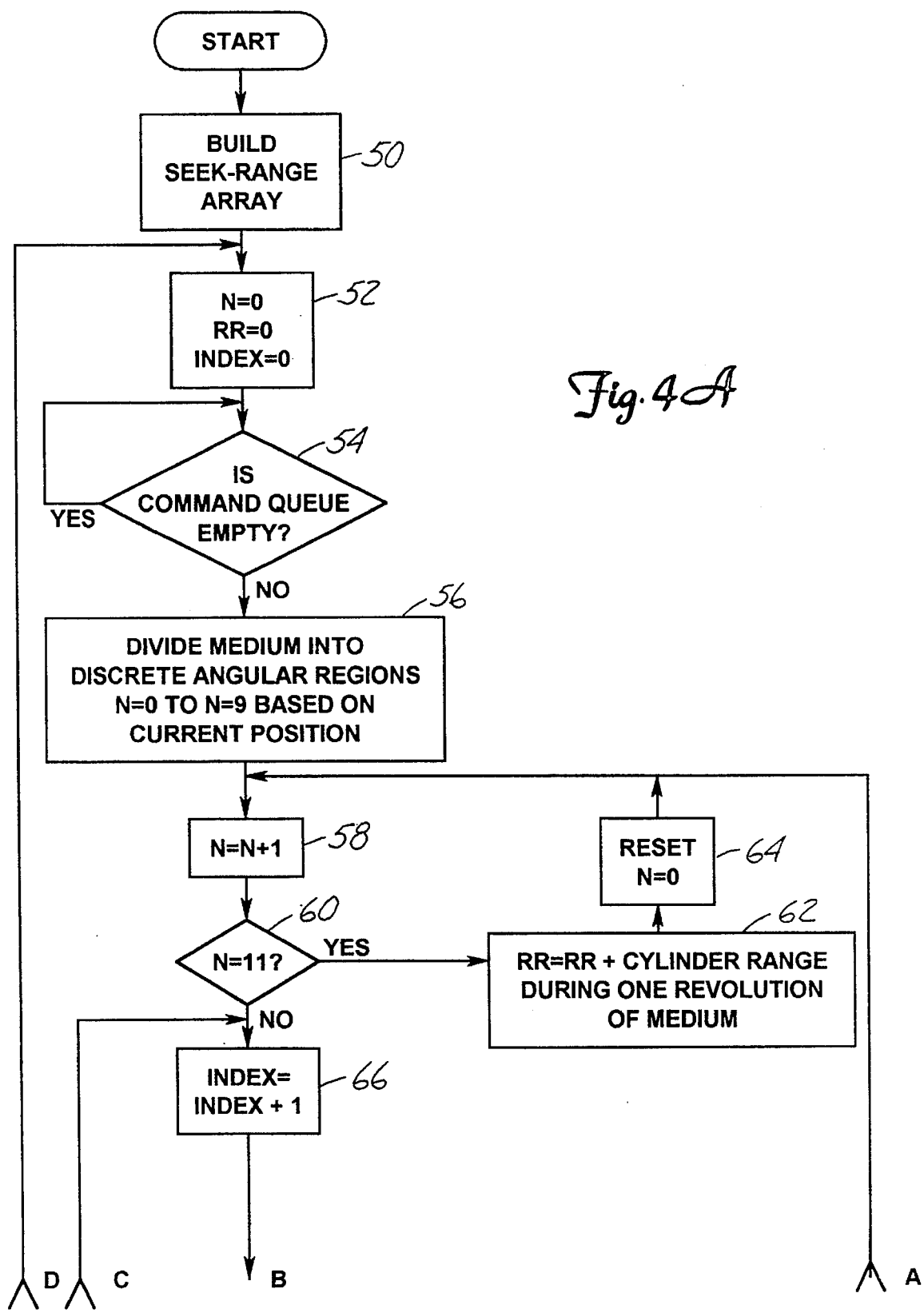
FIG. 4A and 4B are flow diagram of the steps of the method of the present invention.
Figure 4B:
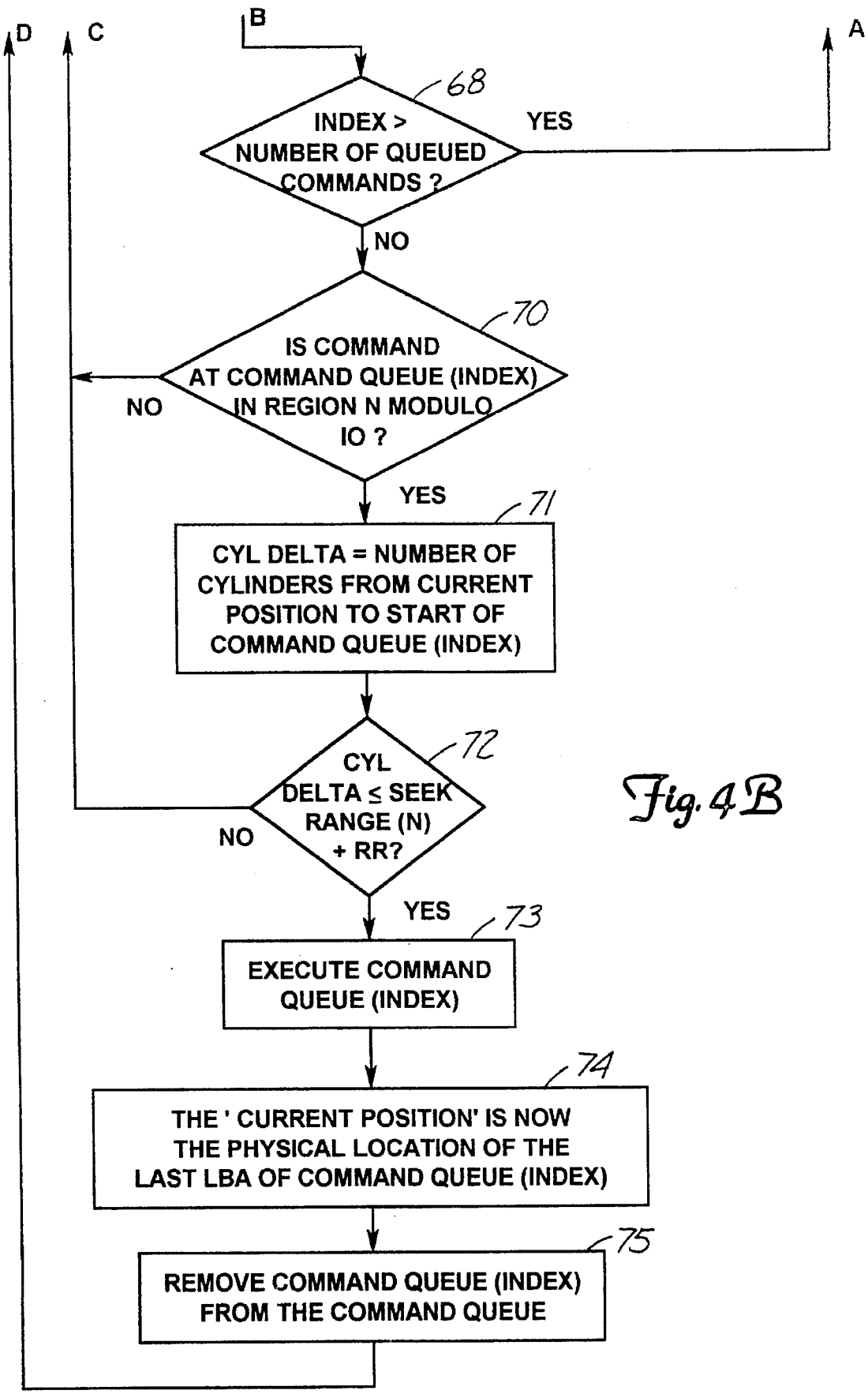

FIG. 4 is a flow diagram of the steps of the method of the present invention using seek ranges as limiting criteria. In step 50, a seek range array is built. The seek range array is indexed according to time in units of tenths of a revolution. Each element of the array contains the number of cylinders which can be crossed in the amount of time corresponding to the element's index. For example, seek range [3]=100 means that a seek can cross 100 cylinders in 3/10 of a revolution.

Initially, a revolution range variable, RR, region variable, N, and a command variable, index, are initialized at zero in step 52. The revolution range variable, RR, identifies the number of revolutions which must be completed for accessing a command location. The region variable, N, is used to identify the particular region being searched for a command address. The command variable, index, identifies the particular command from the command queue being evaluated. The revolution range variable RR is incremented in step 62 if no commands are found which address a location within a number of cylinders that may be traversed by the read/write element during a single revolution of the medium. The sum of seek range (N) and the revolution range variable RR provides a limiting criterion for selecting a command from the command queue array for execution in step 72.

In step 54, the method determines if the command queue is empty As long as the queue is empty, no action will be taken. Note, however, that commands may be added to the command queue at any time.

In step 56, the medium is divided into discrete angular regions having boundary lines which vary based on the current position of read/write element 12. Each discrete angular region is assigned a relative angular region number N=0 to N=9 based upon the present or expected position of the read/write element. Relative angular region number N=0 is assigned to the region containing read/write element 12 just inside its counter-clockwise boundary. Successive clockwise regions are assigned relative angular region numbers N=1 to N=9. Beginning with region number N=1 and ending with region number N=0, the rotational latency of each discrete angular region increases as the region number increases.

In step 58, if the command queue is not empty, the method is increments N to target an angular region having a relative angular region number N, where N is initially 1.

In step 60, the method determines if each discrete angular region has been searched. In this example, if N=11, each of the discrete angular regions 20A–20J has been searched. If each region has not been searched, the method continues for the angular region.

If each of the discrete angular regions have been searched (N=11), the method increments variable RR in step 62 by the number of cylinders that read/write element 12 is able to traverse during one additional complete revolution of the medium. Upon incrementing each seek range (N), the method resets N=0 to again search angular region N=1 in step 58. Consequently, the method iteratively increments the limiting criterion used to select a command for execution in step 72 until a command is identified within the seek range of the discrete angular region having the smallest rotational latency.

In step 66, the index is incremented to access the first command (i.e. index=1) of the command queue (index). The command queue (index) is an array that contains each command in the command queue. Thus, command queue [1] is the first command in the queue, command queue [2] is the second command, etc.

In step 68, the method determines whether it has checked all commands to determine if they address locations within the seek range 24 of the particular region 20. This is accomplished by determining if the index number is greater than the number of commands. If the index number is not greater than the number of commands, the method proceeds with step 70. If the index number is greater than the number of queued commands, the method targets the next succeeding clockwise angular region 20 by returning to step 58 to increment N by one.

In step 70, the method determines whether the logical block address of command queue (index) is located within the next clockwise adjacent region having the smallest rotational latency. Because the medium is divided into discrete angular regions having boundaries which vary based upon the "current position" of the read/write element, the next clockwise region having the smallest rotational latency is region N modulo 10. Thus, the method determines whether the logical block address of command queue (index) is located within region N modulo 10. Alternatively, if the medium is divided into discrete angular regions having fixed boundaries independent of the current position of read/write element 12, step 70 would alternatively determine whether the logical block address of command queue (index) is located within region (N+1) modulo 10.

If the logical block address of command queue (index) falls within the parameters which define angular region N modulo 10, the "cylinder delta", otherwise known as a "seek distance," is computed in step 71. The cylinder delta is the number of cylinders from the current position of the read/write element to the start cylinder of command queue (index). If, at step 70, it is determined that the logical block address of command queue (index) is not within region N modulo 10, the process returns to step 66 to increment the index number to access the next command in the command queue.

In step 72, the method determines if the cylinder delta is less than or equal to a sum of seek range of region N modulo 10 and counter variable RR. If, at step 72, it is determined that the cylinder delta is greater than the cylinder range 24 of that particular angular region, the process return to step 66 to increment the index number to access the next command in the command queue.

If it is determined that the cylinder delta is within the cylinder range of region N modulo 10 and variable RR, step 73 requires execution of command queue (index). Upon execution of the command, the current position of the read/write element is now the physical location of the last logical block address (LBA) of the command just executed (i.e. command queue [1]) as indicated in block 74. In step 75, command queue (index) is removed from the command queue array.

Once a command is executed and removed from the command queue in steps 73 and 75, the process returns to step 52 whereby N, index and RR are reset or reinitialized at zero. The process once again repeats itself to select a command from the present command queue array which meets the limiting criterion. However, because the "current position" is now the physical location of the last logical block address of the command executed in step 73, angular regions N=0 to N=9 are reassigned in step 56 to new physical locations or regions based upon the new "current position" of the read/write element. Because each region N=0 to N=9 varies based upon the "current position" of the read/write element, the seek-range array constructed in step 50, which contains seek ranges assigned to each angular region N=0 to N=9, acts as a template which rotates with the reassignment of regions N=0 to N=9 in step 56. Thus, the present method requires less memory and computation time to optimally select a command from the command queue array for execution.

As an alternative to defining a limiting criterion in the form of a seek range or cylinder range, the method may also define the limiting criterion in units of time. Rather than calculate a cylinder or seek range that the read/write element 12 may traverse during the rotational latency of a particular discrete angular region, the method directly uses the rotational latency of the discrete angular region to identify a command for execution. However, each command's particular seek distance (i.e. the distance in cylinders between the present cylinder path of read/write element 12 and the cylinder path of the command address) must first be identified and be used to estimate a corresponding seek time for comparison to the rotational latency of the discrete angular region. As a result, this method requires that the seek time be estimated for each command within the command queue array.

As with the above methods which reduce the seek range to insure that the command address may be actually reached during the time necessary for the particular discrete angular region to rotate beneath read/write element 12, the present method also insures that the command address may be accessed during the time necessary for the particular discrete angular region containing the address to rotate beneath read/write element 12 by upwardly adjusting the estimated seek time for each seek distance. Alternatively, the rotational latency of each discrete angular region may be downwardly adjusted for the same insurance.

Figure 5:
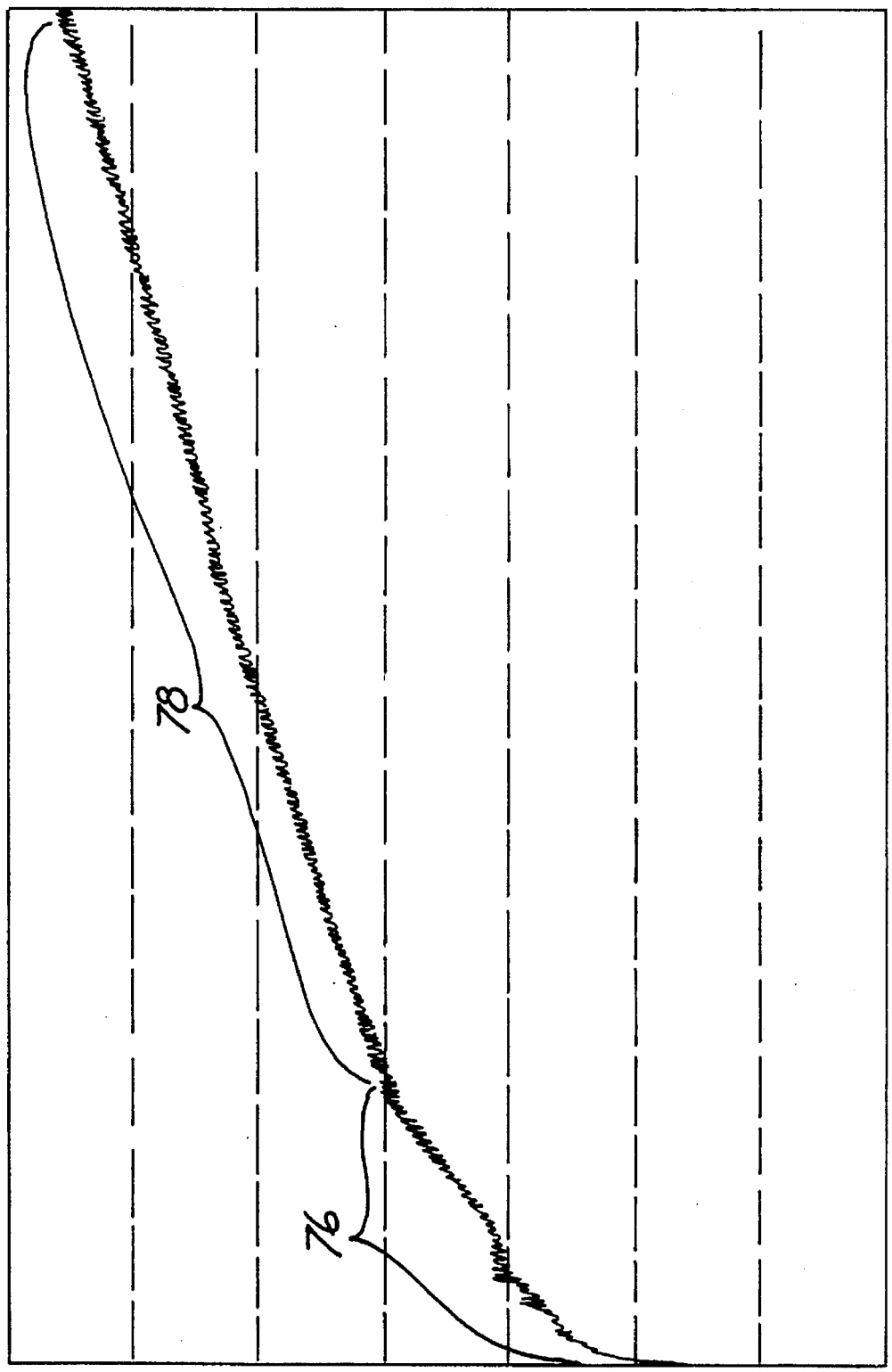
FIG. 5 is a graph illustrating the relationship between seek time versus seek distance.

FIG. 5 is a graph illustrating seek time versus seek distance for a disc. As shown by the graph, the relationship between seek time and seek distance is non-linear (see non-linear portion 76) for short seek distances and is linear (see linear portion 78) for long seek distances. As a result, equations such as quadratic equations, do not model short seeks very well. Moreover, the computation time required to evaluate a quadratic equation to estimate a seek time for a seek distance is significant. Because a disc scheduling method must select the next command to execute during the access time of the current command by computing seek times for a number of commands from the command queue, the time available for the disc scheduling method to select an optimum command to execute is limited. Thus, the use of a quadratic equation may not be fast enough to select a command within the limited time.

In contrast, a seek time array or look-up table models short seeks extremely well and requires little computation time. A seek time array is an array or table which for a preselected number of seek distances contains a corresponding estimated seek time necessary for the read/write element 12 to traverse the seek distance. For example, entry number 1 may indicate the expected seek time duration necessary for read/write element 12 to traverse a seek distance of one cylinder. Entry number 2 may indicate the expected seek time duration for the read/write element 12 to traverse a seek distance of two cylinders.

However, to provide an array or look-up table for each possible seek distance is impractical. Modern disc drives typically contain around 4,000 cylinders. Although a 4,000 entry table is certainly feasible, such an array or table would require a significant amount of the already limited memory.

The present invention solves these problems by using a linear equation to compute seek times for longer seeks in the linear region 78 of the seek profile and a seek time array as a look-up table for short seeks in the non-linear region 76 of the seek profile. Because estimated seek times are only computed for longer seeks which lie in the linear region, the computation is linear instead of quadratic. Consequently, the computation time required to evaluate the linear equation is less. This computation is not required in applications that result in short seeks exclusively. For applications that result in longer seeks distances, the average access time is larger. As a result, the disc scheduling method has more time to perform the computation and to select the next command to be executed.

Preferably, the method of the present invention estimates seek times by computing seek times for longer seeks in the linear region 78 of the seek profile according to the relationship:

$$EST(D) = \frac{(t_n - t_{n-1})(D - C_{n-1})}{(C_n - C_{n-1})} + t_{n-1}$$

where,

D=the identified seek distance traversed by the data retrieval element for a command, EST(D)=estimated seek time for seek distance D, $C_{n-1}$ a first preselected seek length within the linear region 78.

$C_n$=a second preselected seek length within the linear region 78, $t_{n-1}$=time necessary for the data retrieval element to traverse the first preselected seek length, and $t_n$=time necessary for the data retrieval element to traverse the second preselected seek length.

Although the above relationship works well for the seek distances lying solely within linear region 78 of the seek profile, the above relationship cannot evolve to match the system's true behavior because a discontinuity exists where the seek array ends and where the linear approximation begins. This discontinuity can be eliminated by alternatively computing seek time according to the relationship:

$$EST(D) = \frac{(t'_n - t_{n-1})(D - C_{n-1})}{(C_n - C_{n-1})} + t_{n-1}$$

where,

EST (D)=estimated seek time for seek distance D, $C_{n-1}$=a first preselected seek length within linear region 78, $C_n$=a second preselected seek length within linear region 78, $t_{n-1}$=time necessary for the data retrieval element to traverse the first preselected seek length, D=the identified seek distance traversed by the data retrieval element for a command, and $$t'_n = \frac{\beta t_n + M}{\beta + 1}$$

where, $t'_n$=new estimated time for the data retrieval element to traverse the second seek length, β=asymptotic sample length, $t_n$=previous estimated time necessary for the data retrieval element to traverse the second seek length, and $$M = \frac{(t_n + ADJ - C_{tm})(D - C_{tm})}{C_n - C_{tm}} + t_{tm}$$

where,

ADJ=a preselected adjustment based on variance of actual seek times, $C_{tm}$=the maximum seek distance of the seek time array, and $t_{tm}$=the stored seek time corresponding to the maximum seek distance of the seek time array.

The method accesses a seek time array for estimating seek times for short seek distances. The seek time array provides highly accurate seek time estimates for short seeks. Moreover, the estimated seek times for short seeks can be determined very quickly via a simple look-up table. Consequently, in applications that result in a large number of short seeks having short access times, the disc scheduling method is more likely to be able to select the next command in the allotted time.

The seek time array may be either static or dynamic. A static seek time array is a precomputed look-up table constructed from a static seek profile. The static seek profile consists of piecewise-linear approximations of actual seek performance. Straight line segments, each assigned to a non-overlapping range of seek lengths, estimate performance for seeks within their range. A defining set of ordered pairs defines the straight line segments. Each pair consists of a seek length in cylinders ($c_i$) at a seek time ($t_i$): {($c_1,t_1$), ($c_2,t_2$), . . . ,($c_n,t_n$)}. The defining set of ordered pairs is based on seek performance measurements taken from a drive and is ideally selected so as to match the actual profile, adding ample margin to compensate for uncertainties in seek performance due to manufacturing variations and environmental factors such as temperature and humidity. The static seek time array contains data for most likely seek distances to reduce calculation overhead in critical execution paths. Memory requirements for the static seek time array depend on its size. As a result, the static seek array provides quick and accurate seek time estimates for seek distances within non-linear portion 76.

An alternative to the static seek time array is a dynamic or adaptive seek time array. Similar to the static seek array, the adaptive seek array is an array or look-up table containing estimated seek times required for read/write element 12 to traverse a given seek distance or length, in cylinders. Preferably, the adaptive seek array and static seek array initially match. The adaptive seek array uses the static seek array to initialize its look-up table. However, each time read/write element 12 traverses a given number of cylinders to execute a command, the system or firmware senses the actual seek time necessary for read/write element 12 to traverse the given seek distance. Based on the sensed actual seek times for seek distances, the present invention modifies estimated seek times corresponding to seek distances within the adaptive seek array. As a result, the adaptive seek time array continuously modifies its estimate of seek times for seek distances (i.e. seek performance) compensating for differences in performance due to manufacturing deviations, environmental factors such as temperature, humidity and air pressure, and aging. Thus, the adaptive seek array maximizes performance for each individual drive and eliminates the time and cost necessary for designing an optimal piecewise linear approximation for estimating seek performance.

According to the preferred method, the previously stored seek time corresponding to a seek distance is modified according to the relationship:

NEW FIRST STORED SEEK TIME $(D)=\alpha B+(1-\alpha)(C+ADJ)$ where,

D=seek distance, $0<\alpha<1$,

B=previously first stored seek time for distance D,

C=sensed actual seek time for distance D, and

ADJ=a preselected adjustment based upon variance of actual seek times.

The adjustment added to the seek time measurement is a preselected constant and is related to the variance of seek measurements. Although seek times fall into roughly a normal distribution about the mean seek time, the impact of lost revolutions as a result of low seek time estimates is much worse than the impact of lost queue sorting opportunities as a result of high estimates. To counteract this effect, the seek time estimate is intentionally shifted upward by the adjustment so that most seeks will actually take less time to complete than indicated by the table.

Alternatively, the previously stored seek time may be modified according to the relationship:

$$\text{NEW FIRST STORED FIRST SEEK TIME } (D) = \frac{\beta B + C + ADJ}{\beta + 1}$$

where,

D=seek distance

β=asymptotic sample length,

B=previously stored first seek time for distance D,

C=sensed actual first seek time for distance D,

ADJ=a preselected adjustment based upon variance of actual seek time. The above equation is better suited for integer calculation because the equation employs β which is an integer that approximates a number of previous commands that have a significant effect on the current estimate of seek time for the specific seek distance. The value β, otherwise known as the asymptotic sample length, is calculated according to the relationship:

$$\beta = \frac{\alpha}{1-\alpha}$$

where, $0 < \alpha < 1$, and $\beta =$ a positive integer.

In addition to modifying a stored seek time estimate in the adaptive seek time array based upon a sensed actual seek time necessary for traversing a first seek distance, the adaptive method may also additionally modify stored seek times in the adaptive seek time array corresponding to seek distances or lengths proximate the first seek distance for which the actual seek time is sensed. Because the actual seek profile is very smooth and does not have large discontinuities in performances between seeks that differ in length by only a few cylinders, a relationship may be established between adjacent entries in the adaptive seek array or adaptive look-up table. Consequently, a sensed actual seek time for a first seek distance may also be used to modify an estimated seek time in the adaptive seek time array for a second seek distance adjacent or at least proximate the first seek distance. As the second seek distance approaches the first seek distance for which an actual seek time is sensed, the degree to which the estimated seek time for the second seek distance is modified also increases. Preferably, seek distances adjacent to or at least proximate to the seek distance for which an actual seek time has been sensed are modified according to the relationship:

$$\text{NEW SECOND STORED SEEK TIME}(D+\delta) = \frac{\beta(|\delta|+1)B + C + ADJ}{(|\delta|+1)(\beta+1)}$$

where, $\beta =$ asymptotic sample length,

D=first seek distance,

D+$\delta$=second seek distance, $\delta$=distance in cylinders between seek distance D corresponding to sensed actual seek time and seek distance (D+$\delta$) corresponding to old stored second seek time, B=previously stored second seek time for distance (D+$\delta$), C=sensed actual first seek time for distance D, and ADJ=a preselected adjustment based on variance of actual seek times.

Although the use of an adaptive seek array has been described in conjunction with the method directly using rotational latency as a limiting criterion, the adaptive seek time array may also be used to improve performance of the method using a seek range as a limiting criterion. In particular, each seek range may be calculated by individually estimating a plurality of seek times for a plurality of seek distances and identifying a largest one of a plurality of seek distances having an estimated seek time less than the rotational latency assigned to the discrete angular region. Each seek time for the plurality of seek distances is estimated using the above described adaptive seek time array. As a result, the seek ranges assigned to each discrete angular region are optimally adapted to a variety of environmental factors such as temperature, humidity, air pressure and the like. Consequently, the larger margin required to avoid missed revolutions during environmental extremes may be reduced by using actual seek time measurement as feedback to allow the method to adapt to current operating conditions. In addition, the use of the dynamic or adaptive seek time array to dynamically adapt seek ranges also eliminates the tedious task of designing an optimal piecewise linear approximation for estimating seek ranges. The adaptive or dynamic seek time array continually modifies its estimate of seek performance compensating for differences in performance due to manufacturing deviations, environmental factors and aging.

Furthermore, the method using a seek range as a limiting criterion may also calculate the seek ranges by estimating seek distances by computing the seek time used for seek distances greater than or equal to a preselected threshold distance and by selecting the seek time from the seek time array if the seek distance is less than the preselected threshold distance. As a result, the seek ranges may be determined in less time and with lower memory requirements.

In operation, as a current command is being accessed and executed, the disc scheduling method selects the next command for execution. In particular, the current command queue is sorted in ascending order based upon angular region containing the particular commands addressed. The command queue is then traversed in order of angular region number starting with commands addressing locations within an angular region having an angular region value greater than the angular region value associated with the current position of read/write element 12.

As the command queue is traversed, the disc scheduling method computes and identifies a seek distance to be traversed by the read/write element for each command by calculating the difference between the current cylinder number over which read/write element 12 is or expected to be located and the starting cylinder number of the particular command. If the identified seek distance is below a preselected threshold value, the seek time is estimated by selecting a seek time from the seek time array. Alternatively, if the identified seek distance is greater than or equal to the preselected threshold distance, the estimated seek time is computed using a linear equation.

If the estimated seek time is less than the rotational latency of the discrete angular region containing the command address, the command is executed. If the entire command queue is traversed without execution of a command, the command queue is once again traversed beginning with the command addressing a location within the angular region having an angular region value greater than the angular region value associated with the current position of the read/write element 12. However, the revolution period is incremented by the time necessary for disc 10 to complete one rotation. If the entire command queue is traversed once again without finding a command having an estimated seek time less than the rotational latency of its particular discrete angular region plus the time necessary for the disc to complete one rotation, the command queue is again traversed and a command is executed if the command has an estimated seek time less than the sum of the rotational latency of the discrete angular region containing the command address and the time necessary for the disc to complete two rotations. The command queue is traversed as necessary until a command having an estimated seek time less than the sum of the rotational latency of the discrete angular region containing the command address and a revolution period is found and executed; each iteration increasing or incrementing the revolution period by the time necessary for the disc to complete one additional rotation. This process is repeated as necessary, adding one revolution period per iteration until a command is selected.

Figure 6A:
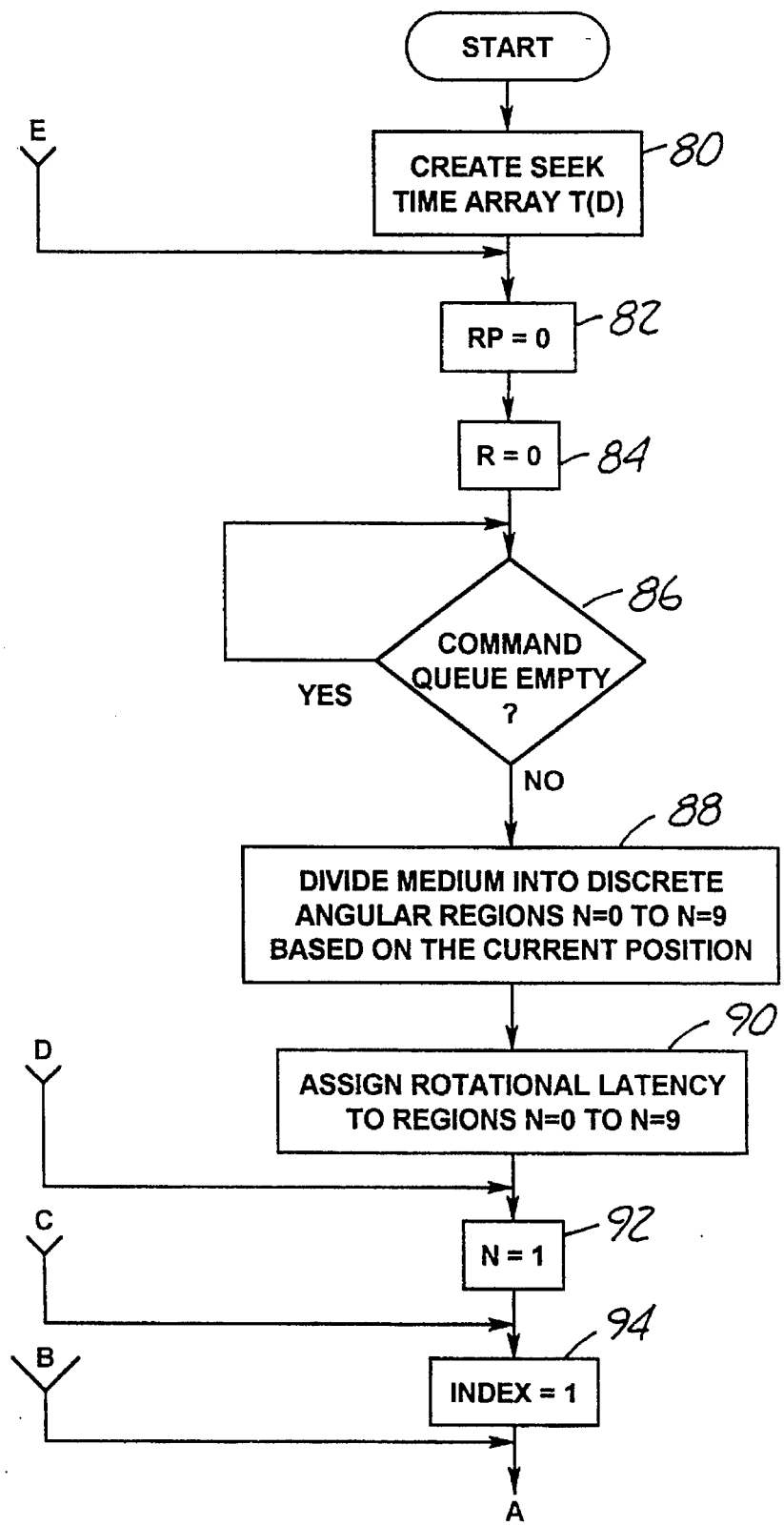
FIG. 6A through 6C are flow diagram of the steps of an alternate method of the present invention.
Figure 6B:
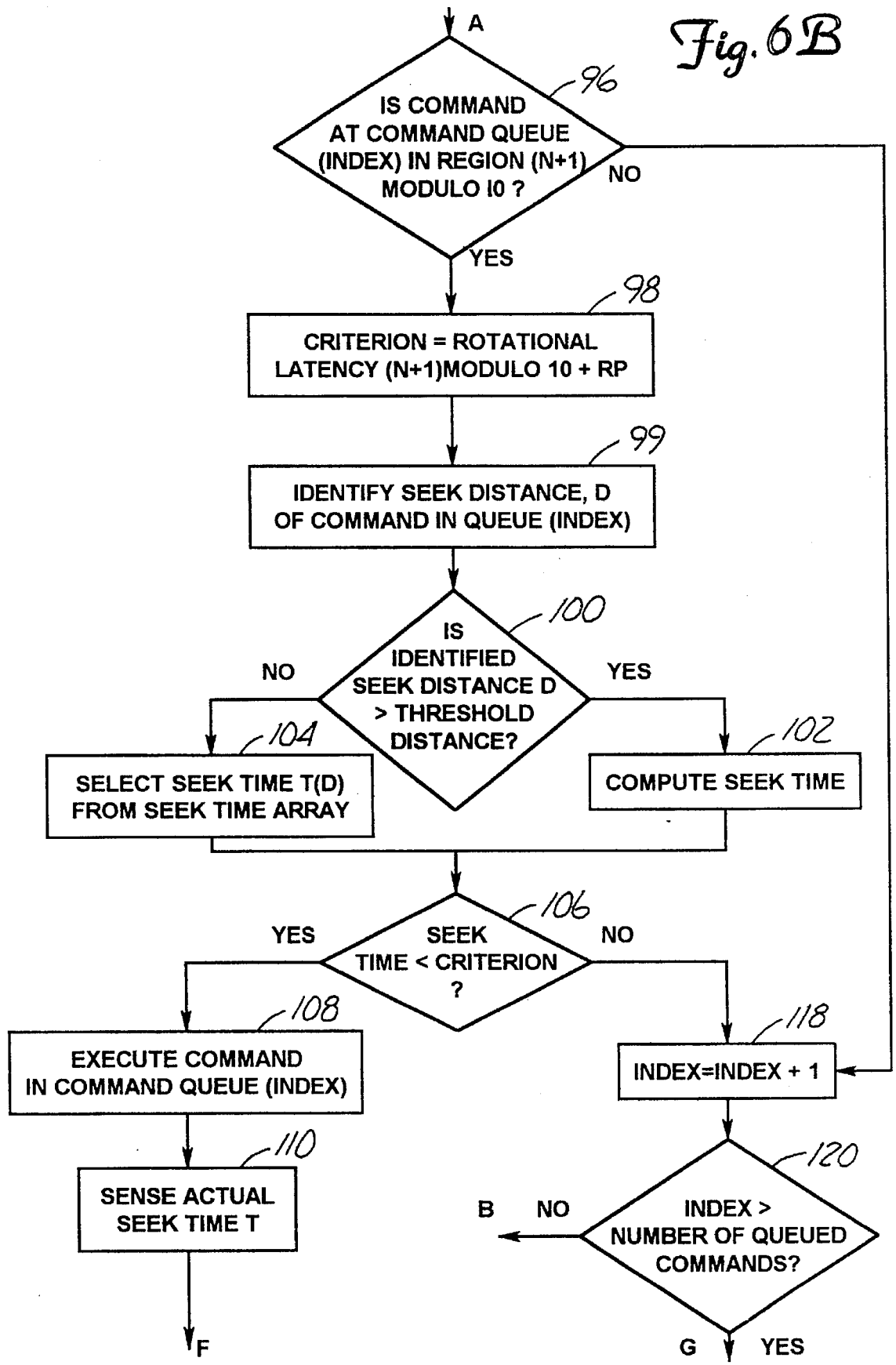
Figure 6C:
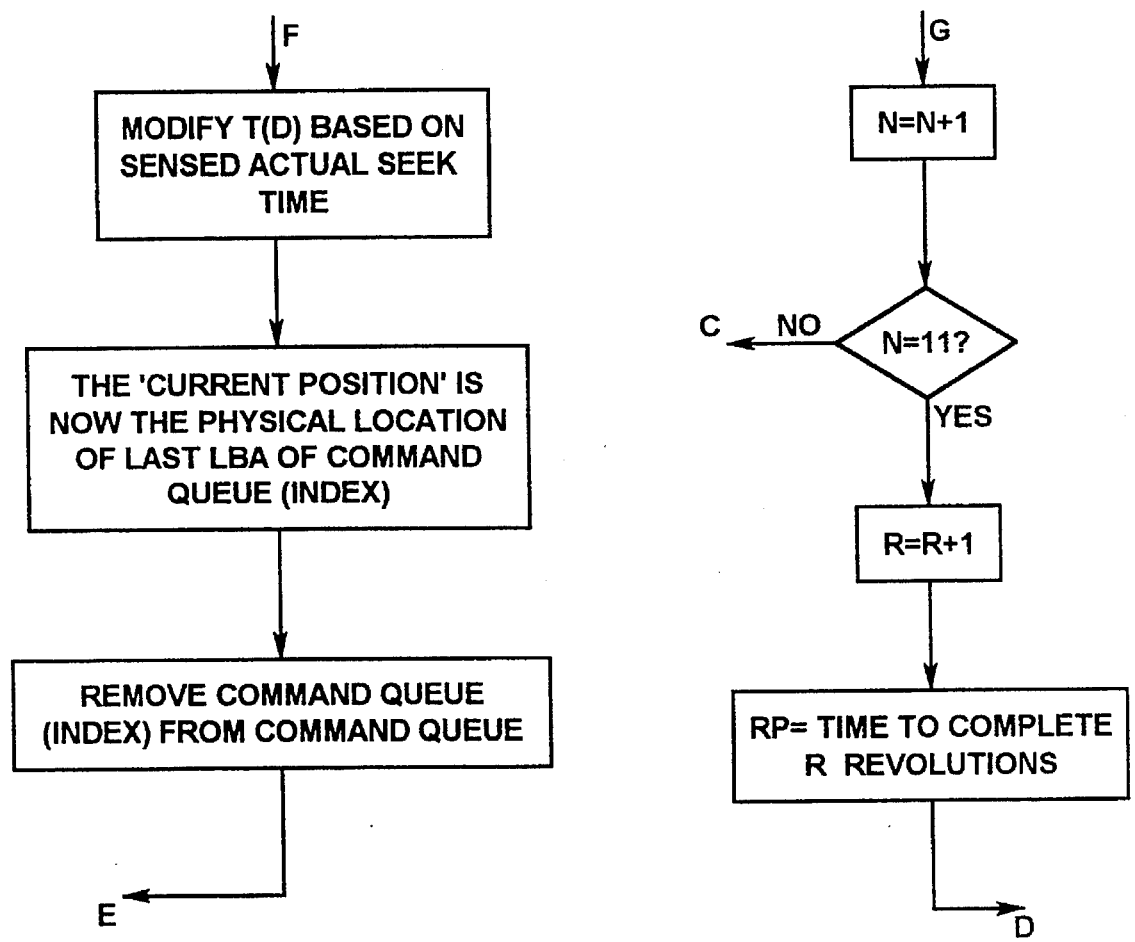

FIG. 6 is a flow diagram of the steps of the method of the present invention directly using rotational latency as a limiting criterion. As shown by step 80 in FIG. 6, an initial seek time array, T(D), is created. Preferably, the seek time array created in step 80 uses the static profile based upon piece-wiselinear approximation of actual seek performance. Although the seek time array may conceivably use any initial values, the seek time array approaches the optimal profile in less time when initialized with a reasonable approximation. The seek time array T(D) contains estimated seek times for corresponding seek distances up to a preselected threshold seek distance value. The preselected threshold seek distance value is preferably near the seek distance at which corresponding seek times begin to be linearly related to seek distances.

As shown by steps 82 and 84, the method initializes a revolution period, RP, and a counter, R, to zero. The revolution period is used as part of the limiting criterion in selecting an optimal command for execution.

In step 86, the method determines if the command queue is empty. As long as the command queue is empty, no action will be taken. As can be appreciated, commands may be added to the command queue at any time.

In step 88, if the command queue is not empty, disc 10 is divided into ten discrete angular regions N=0 to N=9 based upon the present location of the read/write element or the expected location of the read/write element at the end of execution of the current command. Again, while the invention is described with ten regions N, the actual number may be any convenient number. Preferably, disc 10 is divided into angular regions having fixed boundaries independent of the current position of the read/write element. Alternatively, disc 10 is divided into angular regions having boundaries which vary based upon the current or expected position of the read/write element. Angular region N=0 is selected so as to contain the present location or expected location of the read/write element. Each clockwise successive angular region is successively numbered from one to nine.

In step 90, each angular region N=0 to N=9 is assigned a rotational latency based on the present location of the read/write element. Because region N=0 is assigned so as to always contain the read/write element and because the medium is preferably divided into ten angular regions having fixed boundaries, region N=0 will always have a rotational latency of 9/10ths of a revolution. Region N=1 will always have a rotational latency of one complete revolution. Regions N=2 to N=9 will have a rotational latency of (N−1)/10ths of a revolution, wherein N is the region number. Alternatively, if disc 10 is divided into regions having varying boundaries, region N=0 will have a rotational latency of one revolution and regions N=1 to N=9 will have a rotational latency of N/10ths of a revolution where N is the region's relative angular region number.

In steps 92 and 94, N and index are each initialized at one, respectively. The variable N is used to indicate the particular region in which the method searches for a command meeting a limiting criterion. The index is used for identifying which command from the command queue array is being presently evaluated for possible selection and execution.

In step 96, the method determines whether the command at command queue (index) is within region (N+1) modulo 10. Because N is initialized at one in step 92, the method determines whether the present command being evaluated addresses a command within the region having the smallest rotational latency. Because the medium is preferably divided into discrete angular regions having fixed boundaries independent of the current position of the read/write element, the discrete angular region having the smallest rotational latency is region N=2, as explained previously. Thus, step 96 determines whether the command lies within region (N+1) modulo 10. Alternatively, if the medium is divided into discrete angular regions having boundaries which vary based upon the current position of the read/write element, step 96 would alternatively determine whether command queue (index) addresses a location within region N modulo 10.

If the command at command queue (index) being presently evaluated does not address a location within region (N+1) modulo 10, the method targets the next command in the command queue by incrementing the index in step 118. In step 120, the method identifies whether it has checked all of the commands to determine whether any of the commands lie within region (N+1) modulo 10. This is a accomplished by determining if the index number is greater than the number of commands in the command queue. If the index number is not greater than the number of commands, the method returns to step 96 for the next command in command queue. If the index number is greater than the number of queue commands, the method targets the next succeeding clockwise angular region by incrementing N by one in step 122. In step 124, the method determines if all of the angular regions have been searched. In this example, if N=11, each of the discrete angular regions 20A–20J have been searched. If all of the angular regions of disc 10 have not been searched, the method returns to step 94 for the next successive clockwise angular region.

In step 98, the assigned rotational latency for the particular targeted region targeted is added to the current revolution period, RP, to establish a limiting criterion for determining whether the targeted command should be selected for execution.

In step 99, the method identifies a seek distance D for command queue (index). The command queue index is an array that contains each command in the command queue. Thus, command queue [1] is the first command in queue, command queue [2] is the second command etc.

In step 100, the identified seek distance D is compared to the preselected threshold distance. If the identified seek distance D is greater than the threshold distance, the method estimates a seek time for the seek distance D by computing the seek time at step 102 using an equation. Preferably, the method in step 102 uses a linear equation to estimate seek time for seek distance D. If the identified seek distance D is not greater than the threshold distance, the method estimates a seek time for seek distance D by selecting a seek time T(D) from the seek time array in step 104.

In either case, at step 106, the estimated seek time of the command in command queue (index) is compared with the current criterion calculated in step 98.

If the estimated seek time for command queue (index) at step 106 is less than the current criterion the method executes the command in step 108. During execution of the command, the system moves the read/write element to the first address addressed by command queue (index). The firmware senses the actual time required to move the read/write element radially across seek distance D in step 110, and modifies the seek time array T(D) at step 112. In addition to modifying an entry in the seek time array corresponding to seek distance D, the estimated seek times may also be modified for seek distances proximate seek distance D. As a result, the method modifies the seek time array and adapts the seek time array to compensate for differences in performance due to manufacturing deviations, environmental factors such as temperature, humidity and air pressure, and aging.

As shown in steps 114 and 116, the "current position" of the read/write element is now the physical location of the last logical block address of command queue (index). After execution of command queue (index), command queue (index) is removed from the command queue.

If the estimated seek time for command queue (index) at step 106 is not less than the current criterion, the method targets the next command in the command queue by incrementing the index in step 118. In step 120, the method identifies whether it has checked all commands to determine if any of the commands address locations which fall within the parameters which define region (N+1) modulo 10 and which also have an estimated seek time less than the current criterion. This is accomplished determining if the index number is greater than the number of commands in the command queue. If the index number is not greater than the number of commands, the method returns to step 96 for the next command in command queue. If the index number is greater than the number of queue commands, the method targets the next succeeding clockwise angular region by incrementing N by 1 in step 122.

In step 124, the method determines if all of the angular regions have been searched. In this example, if N=11, each of the discrete angular regions 20A–20J have been searched. If all angular regions of disc 10 have not been searched (i.e. N<11), the method returns to step 94 for the next successive clockwise angular region.

However, if all of the discrete angular regions 20A–20J have been searched, the method enlarges the current criterion by the time necessary to complete an additional revolution of disc 10. This is accomplished in steps 126 and 128 by incrementing the variable R by one, whereby the revolution period, RP, is the time necessary to complete R revolutions. The method then repeats beginning with step 92. Thereafter, the method compares the estimated seek time of each command in the command queue array with the enlarged criterion which is the sum of the rotational latency of the particular command and the time necessary to complete R revolutions.

Although the present invention has been described with reference to preferred embodiments, workers skilled in the art will recognize that changes may be made in form and detail without departing from the spirit and scope of the invention.

What is claimed is:

1. In a system including a data retrieval element and a rotating medium, a method for decreasing rotational latency comprises:

dividing the medium into a plurality of discrete angular regions;

for each discrete angular region, identifying a number of cylinders that may be traversed by the data retrieval element during a single revolution of the medium;

assigning a rotational latency to each discrete angular region based on a current location of the retrieval element;

searching a command queue array for a command that addresses a location within a range of cylinders determined by the number of cylinders in the discrete angular region having the smallest rotational latency; and executing the command addressing a location in the range of cylinders in the selected discrete angular region of the medium.

2. The method of claim 1 wherein a command queue array comprises each command in the command queue.

3. The method of claim 1 and further comprising removing the executed command from the command queue array.

4. The method of claim 1 wherein identifying the number of cylinders for each discrete angular region includes:

individually estimating a plurality of seek times for a plurality of seek distances; and identifying a largest one of the plurality of seek distances having an estimated seek time less than the rotational latency assigned to the discrete angular region.

5. The method of claim 4 wherein individually estimating a plurality of seek times for a plurality of seek distances includes:

creating an initial seek time array having stored seek times for seek distances traversed by the data retrieval element;

sensing a first actual seek time corresponding to a first seek distance;

modifying a first stored seek time corresponding to the first seek distance based upon the first sensed actual seek time for the first seek distance; and estimating a seek time for traversing a first seek distance by reading the first stored seek time corresponding to the first seek distance in the seek time array.

6. The method of claim 4 wherein estimating a plurality of seek times for a plurality of seek distances includes:

creating a seek time array having stored seek times corresponding to seek distances traversed by the data retrieval element which are less than a preselected threshold distance;

estimating a seek time for one of the plurality of seek distances by:

computing the seek time if the seek distance is greater than or equal to the preselected threshold distance; and selecting the seek time from the seek time array if the seek distance is less than the preselected threshold distance.

7. The method of claim 1 wherein identifying the number of cylinders includes:

creating a seek-range array having stored seek ranges corresponding to each discrete angular region.

8. In a disc drive system including a read/write element and a rotating disc, a method to decrease access time during a short seek comprises:

dividing the disc into a plurality of discrete angular regions;

assigning a rotational latency to each discrete angular region based on a current location of the read/write element;

for each discrete angular region, defining a seek range by identifying a number of cylinders that may be traversed by the read/write element during the time to rotate the disc through a predetermined number of discrete angular regions on the disc;

building a command queue array;

searching the command queue array for a command addressing a location on the disc within a range of cylinders determined by the number of cylinders and in the discrete angular region having the smallest rotational latency; and executing the command.

9. The method of claim 8 wherein the seek range represents a number of cylinders which may be crossed by the read/write element within a single revolution of the disc.

10. The method of claim 8 wherein a command queue array comprises each command in the command queue.

11. The method of claim 8 and further comprising removing the executed command from the command queue array.

12. In a disc drive system including a read/write element and a rotating disc, a method to decrease access time during a short seek comprises:

(a) dividing the disc into a plurality of discrete angular regions;

(b) assigning a rotational latency to each discrete angular region based on the current position of the read/write element;

(c) defining a seek range by identifying, for each discrete angular region, a number of cylinders that may be traversed by the read/write element during the time to rotate the disc through a predetermined number of discrete angular regions of the disc;

(d) searching a command queue array addressing a location in the seek range and in the discrete angular region having the lowest rotational latency;

(e) moving the read/write element relative to the disc to the location addressed by the command found in the command queue and executing the command; and (f) removing the command from the command queue.

13. The method of claim 12 and further including assigning a new rotational latency to each discrete angular region based on the position of the read/write element following movement to the location addressed by the first-named command, repeating step (c) to define a new seek range, searching the command queue array for a second command addressing a location in the new seek range and in the discrete angular region having the new lowest rotational latency, moving the read/write element relative to the disc to the location addressed by the second command, and executing the second command.

14. In the disc drive system including a transducing element and a rotating media, a process to decrease access time during a short seek comprising:

dividing the media into a plurality of discrete angular region;

for each angular region, defining a seek range by identifying a number of tracks on the medium that may be traversed by the transducing element from the current location during a single revolution of the medium;

assigning a rotational latency to each discrete angular region based on a current location of the transducing element;

identifying commands in a command queue array addressing locations in the seek range; and selecting an identified command addressing a location in the discrete angular region having the smallest rotational latency.

15. The process of claim 14 and further comprising removing the identified command from the command queue array.

16. The process of claim 14 where the identification of commands and selection of identified commands is performed for each angular region in succession.

17. In a system including a data retrieval element and a rotating medium, a method for decreasing rotational latency comprising:

(a) dividing the medium into a plurality of discrete angular regions;

(b) assigning a rotational latency to each discrete angular region based on a current location of the data retrieval element;

(c) for each discrete angular region, identifying the number of cylinders that may be traversed by the data retrieval element during N revolutions of the medium, wherein N is initially 1;

(d) searching a command queue array for a command that addresses a location within a range of cylinders determined by the number of cylinders in the discrete angular region having the smallest rotational latency;

(e) incrementing N by one and repeating steps (c) and (d) if a command is not found; and (f) executing the command.

18. In a system including a data retrieval element and a rotating medium, a method for decreasing rotational latency comprising:

dividing the medium into a plurality of discrete angular regions;

assigning a rotational latency to each discrete angular region based on a current location of the data retrieval element;

for each successive discrete angular region, beginning with the discrete angular region having the smallest rotational latency, (a) searching a command queue array for a command addressing a location within the discrete angular region, (b) identifying a seek distance to be traversed by the data retrieval element for the command, (c) estimating a seek time for traversing the identified seek distance, and (d) executing the command if the estimated seek time of the command is less than a sum of the rotational latency of the discrete angular region containing the location addressed by the command, and a revolution period, wherein the revolution period is initially zero, and (e) iteratively repeating steps (a)–(d) for any remaining commands in the command queue array if the command is not executed.

19. The method of claim 18 further including:

incrementing the revolution period by the time necessary for the medium to complete one rotation if every command in the command queue array has an estimated seek time greater than or equal to the sum of the rotational latency of the discrete angular region containing the location addressed by each command and the previous revolution period.

20. In a system including a data retrieval element and a rotating medium, a method for estimating seek times for distances traversed by the data retrieval element, the method comprising:

creating a seek time array having stored seek times corresponding to seek distances traversed by the data retrieval element which are less than a preselected threshold distance;

identifying a seek distance to be traversed by the data retrieval element for a command; and determining whether the identified seek distance is greater than the threshold distance; and estimating a seek time for traversing the identified seek distance by:

computing the seek time if the seek distance of the command is greater than or equal to the preselected threshold distance, and selecting the seek time from the seek time array if the seek distance is less than the preselected threshold distance.

21. The method of claim 20 wherein creating a seek time array includes:

creating an initial seek time array having stored seek times corresponding to seek distances traversed by the data retrieval element;

sensing a first actual seek time corresponding to a first seek distance; and modifying a first stored seek time corresponding to the first seek distance based upon the first sensed actual seek time for the first seek distance.

22. The method of claim 21 including:

adjusting the first stored seek time by a preselected time value based upon variance of actual seek times.

23. The method of claim 21 further including:

augmenting the first stored seek time by a preselected time value so that actual seek times for the first seek distance are less than the first stored seek time.

24. The method of claim 21 wherein modifying the first stored seek time includes creating a new first stored seek time for the first seek distance according to the relationship:

NEW STORED FIRST SEEK TIME $(D) = \alpha B + (1-\alpha)(C + ADJ)$ where, $0 < \alpha < 1$;

D=identified seek distance;

B=previously stored first seek time for seek distance D;

C=sensed actual first seek time for seek distance D; and

ADJ=a preselected adjustment based on variance of actual seek times.

25. The method of claim 21 wherein modifying the first stored seek time includes creating a new stored first seek time for the first seek distance according to the relationship:

$$\text{NEW STORED FIRST SEEK TIME } (D) = \frac{\beta B + C + ADJ}{\beta + 1}$$

where,

D=identified seek distance;

$\beta$=asymptotic sample length;

B=previously stored first seek time for seek distance D;

C=sensed actual first seek time for seek distance; and

ADJ=a preselected adjustment based on variance of actual seek times.

26. The method of claim 21 further including:

modifying a second stored seek time corresponding to a second seek distance based upon the sensed actual seek time for the first seek distance.

27. The method of claim 21 wherein modifying the second stored seek time comprises:

modifying the second stored seek time corresponding to a second seek distance based upon the sensed actual seek time for the first seek distance and the proximity of the second seek distance to the first seek distance.

28. The method of claim 27 wherein the second seek time is modified less as a proximity of the second seek distance to the first seek distance decreases.

29. The method of claim 20 wherein the seek time is computed using a linear equation.

30. The method of claim 20 wherein the estimated seek time is computed according to the relationship:

$$EST(D) = \frac{(t_n - t_{n-1})(D - C_{n-1})}{(C_n - C_{n-1})} + t_{n-1}$$

where,

EST(D)=estimated seek time for seek distance D $C_{n-1}$=a first preselected seek length within the linear region;

$C_n$=a second preselected seek length within the linear region;

$t_{n-1}$=time necessary for the data retrieval element to traverse the first preselected seek length;

$t_n$=time necessary for the data retrieval element to traverse the second preselected seek length; and D=the identified seek distance traversed by the data retrieval element for a command.

31. The method of claim 20 wherein the estimated seek time is computed from the relationship:

$$EST(D) = \frac{(t'_n - t_{n-1})(D - C_{n-1})}{(C_n - C_{n-1})} + t_{n-1}$$

where,

EST (D)=estimated seek time for seek distance D, $C_{n-1}$=a first preselected seek length within the linear region, $C_n$=a second preselected seek length larger than the first seek length within the linear region, $t_{n-1}$=time necessary for the data retrieval element to traverse the first preselected seek length, D=the identified seek distance traversed by the data retrieval element for a command, and $$t'_n = \frac{\beta t_n + M}{\beta + 1}$$

where, $\beta$=asymptotic sample length, $t_n$=time necessary for the data retrieval element to traverse the second seek length, and $$M = \frac{(t_n + ADJ - C_{tm})(D - C_{tm})}{C_n - C_{tm}} + t_{tm}$$

where,

ADJ=a preselected adjustment based on variance of actual seek times, $C_{tm}$=the maximum seek distance of the seek time array, and $t_{tm}$=the stored seek time corresponding to the maximum seek distance of the seek time array.

32. In a system including a data retrieval element and a rotating medium, a method for estimating seek times for distances traversed by the data retrieval element, the method comprising:

creating an initial seek time array having stored seek times for seek distances traversed by the data retrieval element;

sensing a first actual seek time corresponding to a first seek distance;

modifying a first stored seek time corresponding to the first seek distance based upon the first sensed actual seek time for the first seek distance; and estimating a seek time for traversing the first seek distance by reading the first stored seek time corresponding to the first seek distance in the seek time array.

33. In a system including a data retrieval element and a rotating medium, a method for decreasing rotational latency comprising:

creating a seek time array having stored seek times corresponding to seek distances traversed by the data retrieval element which are less than a preselected threshold distance;

dividing the medium into a plurality of discrete angular regions;

assigning a rotational latency to each discrete angular region based on a current location of the data retrieval element;

searching a command queue array for at least one command that addresses a location within a selected discrete angular region;

identifying a seek distance to be traversed for each command found which addresses a location within the selected discrete angular region;

determining whether the identified seek distance is greater than the threshold distance;

estimating a seek time for traversing the identified seek distance by:

computing the seek time if the seek distance of the command is greater than the preselected threshold distance, and selecting the seek time from the seek time array if the seek distance is less than or equal to the preselected threshold distance; and executing the command if the estimated seek time of the command is less than the rotational latency of the selected discrete angular region.

34. In a disc drive system including a read/write element and a rotating disc, a method to decrease access time during a short seek comprising:

(a) creating a seek time array having stored seek times corresponding to seek distances traversed by the read/write element which are less than a preselected threshold distance;

(b) dividing the disc into a plurality of discrete angular regions, each region being assigned an angular region value;

(c) assigning a rotational latency to each discrete angular region based on the current position of the read/write element;

(d) selecting a command from the command queue array beginning with a command addressing a location within an angular region having an angular region value greater than an angular region value associated with the current position of the read/write element, and (e) estimating a seek time for the selected command by:
  (1) identifying a seek distance to be traversed by the read/write element for the command,
  (2) determining whether the identified seek distance is greater than the threshold distance,
  (3) estimating seek time for the command by:
    computing the seek time if the seek distance of the command is greater than or equal to the threshold distance, and
    selecting the seek time from the seek time array if the seek distance of the command is less than or equal to the preselected threshold distance, and (f) executing the command if the estimated seek time of the command is less than a sum of the rotational latency of the discrete angular region containing the location addressed by the command, and a revolution period, wherein the revolution period is initially zero.

35. The method of claim 34 further including:

incrementing the revolution period by the time necessary for the medium to complete one rotation if every command in the command queue array has an estimated seek time greater than or equal to the sum of the rotational latency of the discrete angular region containing the location addressed by the command and the previous revolution period.

36. The method of claim 34 including iteratively repeating steps (1)–(3) for each command with command queue array.

* * * * *

UNITED STATES PATENT AND TRADEMARK OFFICE
CERTIFICATE OF CORRECTION

PATENT NO. : 5,570,332

DATED : OCTOBER 29, 1996

INVENTOR(S) : MARK A. HEATH, D. CHRISTOPHER PRUETT, BANG C. NGUYEN

It is certified that error appears in the above-indentified patent and that said Letters Patent is hereby corrected as shown below:

Col. 10, line 53, after "78", delete ".", insert --,--

Col. 15, line 2, delete "piece-wiselinear", insert --piecewise-liner

Signed and Sealed this

Eleventh Day of March, 1997

Attest:

BRUCE LEHMAN

Attesting Officer

Commissioner of Patents and Trademarks